(12) United States Patent
Choi et al.

(10) Patent No.: US 8,376,426 B2
(45) Date of Patent: Feb. 19, 2013

(54) PLASTIC COMPOSITE BUMPER BEAM FOR VEHICLE

(75) Inventors: Chihoon Choi, Gyeonggi-do (KR);
Yohan Hahm, Seoul (KR); Jan-Anders Manson, Chexbres (SE); Tony Jonsson, Bulle (SE)

(73) Assignees: Hyundai Motor Company, Seoul (KR); EELCEE SA, Lausanne (CH)

( * ) Notice: Subject to any disclaimer, the term of this patent is extended or adjusted under 35 U.S.C. 154(b) by 0 days.

(21) Appl. No.: 13/238,501

(22) Filed: Sep. 21, 2011

(65) Prior Publication Data

US 2012/0306222 A1 Dec. 6, 2012

(51) Int. Cl.
*B60R 13/02* (2006.01)

(52) U.S. Cl. .................................. 293/120; 293/102

(58) Field of Classification Search .................. 293/120, 293/102
See application file for complete search history.

(56) References Cited

U.S. PATENT DOCUMENTS

| | | | |
|---|---|---|---|
| 5,290,079 A * | 3/1994 | Syamal | 293/120 |
| 6,692,064 B1 * | 2/2004 | Porter | 296/187.01 |
| 2005/0023847 A1 | 2/2005 | Van Damme et al. | |

FOREIGN PATENT DOCUMENTS

| | | |
|---|---|---|
| JP | 07237512 A | 9/1995 |
| JP | 09216225 A | 8/1997 |
| KR | 10-0793894 | 5/2007 |
| KR | 10-2010-0006672 | 1/2010 |
| KR | 10-2010-0123066 | 11/2010 |

* cited by examiner

*Primary Examiner* — Joseph Pape

(74) *Attorney, Agent, or Firm* — Edwards Wildman Palmer LLP; Peter F. Corless

(57) ABSTRACT

Disclosed is a plastic composite bumper beam for a vehicle, which can achieve a reduction in weight and cost and has improved mechanical properties, structural strength, and crash performance, load introduction, load distribution to the fixation points, thus reducing the thickness of the bumper, compared to conventional plastic composite bumper beams. Therefore, it is possible to improve the degree of freedom in design and the marketability due to the reduction in thickness of the bumper. More specifically, the plastic composite bumper beam for a vehicle includes a bumper beam body having the shape of a bumper beam and formed of a fiber-reinforced plastic composite material; and an insert reinforcing member inserted into the bumper beam body, the insert reinforcing member having a loop shape and disposed in the longitudinal direction of the bumper beam body.

11 Claims, 5 Drawing Sheets

PLASTIC COMPOSITE BUMPER BEAM FOR VEHICLE

CROSS-REFERENCE TO RELATED APPLICATION

This application claims under 35 U.S.C. §119(a) the benefit of Korean Patent Application No. 10-2011-0052441 filed May 31, 2011, the entire contents of which are incorporated herein by reference.

BACKGROUND (a) Technical Field

The present invention relates to a bumper beam for a vehicle. More particularly, it relates to a plastic composite bumper beam for a vehicle, which can achieve a reduction in weight and cost reduction while at the same time having excellent mechanical properties and crash performance.

(b) Background Art

In general, a bumper assembly for a vehicle is mounted on the front and rear ends of a vehicle body, respectively, to absorb impact in the event of a collision, thus protecting a driver and passengers during an accident and preventing deformation of the vehicle body. A basic configuration of the vehicle bumper assembly is shown in FIG. 1. As shown in the figure, the vehicle bumper assembly generally includes a bumper cover 10 for covering or enclosing an entire bottom area of the front or rear end of the vehicle body, an energy absorber 20 for absorbing vibrations and impact energy translated of the bumper cover 10, a bumper beam (or a back beam) 30 located at the rear of the energy absorber 20 to protect the vehicle body from damage upon impact, and a stay 40 for fixing and supporting the bumper beam 30 to the vehicle body.

In a compact vehicle, the bumper assembly may be composed of only the bumper cover, the bumper beam, and the stay, without the energy absorber to reduce the weight. In this configuration, the bumper beam is configured to efficiently absorb the impact energy. The bumper beam may be formed from various materials such as steel, aluminum, plastic composite, etc., according to the vehicle model or required performance.

U.S. Pat. No. 5,290,079 and U.S. Pat. No. 6,286,879 each disclose a fiber-reinforced plastic composite bumper beam, and U.S. Pat. No. 6,817,638 discloses a bumper beam formed of a glass mat-reinforced thermoplastic (GMT), having a C-shaped section, and including a reinforcing sheet. European Patent No. 0945253 discloses a bumper beam formed of a filled GMT composite material containing polyolefin and glass fibers, and Korean Patent Publication No. 10-2007-0111812 discloses a bumper beam having an external beam member formed of a GMT material and an internal beam member formed of a steel material.

Moreover, Korean Patent Application Publication No. 10-2010-0104457 discloses a bumper beam using a GMT or long fiber-reinforced composite, and Korean Patent Application Publication No. 10-2010-0006672 discloses a bumper beam including a unidirectional reinforcing fiber sheet introduced by an LFT-D process or integrally formed.

These conventional plastic composite bumper beams, as can be seen by the descriptions above, are mainly formed of GMT composites including unidirectional continuous fibers by press molding (i.e., compression molding) the materials into the shape of the bumper beam.

Typically, the GMP bumper beam is formed to have a thickness of about 4 to 15 mm to ensure the strength and crash performance. However, it is necessary to reduce the thickness of the bumper to enhance the degree of freedom in the design of the bumper and, at the same time, improve the absorption efficiency of impact energy to reduce the repair cost which are associated with an accident.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a plastic composite bumper beam, thermoplastic or thermoset based, for a vehicle, which can achieve a reduction in weight and cost reduction and has excellent mechanical properties, structural strength, crash performance, load introduction, load distribution to the fixation points, and thus reduces the thickness of the bumper, compared to conventional plastic composite bumper beams which require at least 4 mm-15 mm in order to be effective in an accident. Therefore, it is possible to improve the degree of freedom in design and the marketability due to the reduction in thickness of the bumper.

In one aspect, the present invention provides a plastic composite bumper beam for a vehicle, thermoplastic or thermoset based, includes a bumper beam body having the shape of a bumper beam and formed of a fiber-reinforced plastic composite material. Additionally, an insert reinforcing member is inserted into the bumper beam body. This insert reinforcing member has a loop shape and is disposed in the longitudinal direction of the bumper beam body.

In an exemplary embodiment, the bumper beam body may also include a fiber-reinforced plastic composite material selected from the group consisting of a glass mat-reinforced plastic (GMRP) composite material, a long fiber-reinforced plastic (LFRP) composite material, and a short fiber-reinforced plastic (SFRP) composite material.

In another exemplary embodiment, the insert reinforcing member may include a fiber-reinforced plastic composite material having relatively higher strength than the bumper beam body itself. Additionally, the fiber-reinforced plastic composite material of the insert reinforcing member may be a continuous fiber-reinforced plastic composite material.

In yet another exemplary embodiment, the fiber-reinforced plastic composite material for the bumper beam body and the fiber-reinforced plastic composite material for the insert reinforcing member may include reinforcing fibers selected from the group consisting of glass fibers, carbon fiber, natural fibers, aramid fibers, and ultrahigh molecular weight polyethylene fibers.

In still yet another illustrative embodiment, the fiber-reinforced plastic composite material for the bumper beam body and the fiber-reinforced plastic composite material for the insert reinforcing member may include the same matrix such that the insert reinforcing member is integrated with the bumper beam body during molding.

In still yet another illustrative embodiment, the fiber-reinforced plastic composite material for the bumper beam body and the fiber-reinforced plastic composite material for the insert reinforcing member comprise different matrix such that the insert reinforcing member is integrated with the bumper beam body during molding.

In a further illustrative embodiment, the surface of the bumper beam body is reinforced with a woven, braided or knitted fiber-reinforced sheet or a continuous fiber-reinforced sheet fixed thereto.

In another further illustrative embodiment, the bumper beam body is further reinforced with an insert reinforcing member having a discontinuous straight line or curve shape and inserted in the longitudinal direction of the bumper beam body, in addition to the loop-shaped insert reinforcing member.

Other aspects and illustrative embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
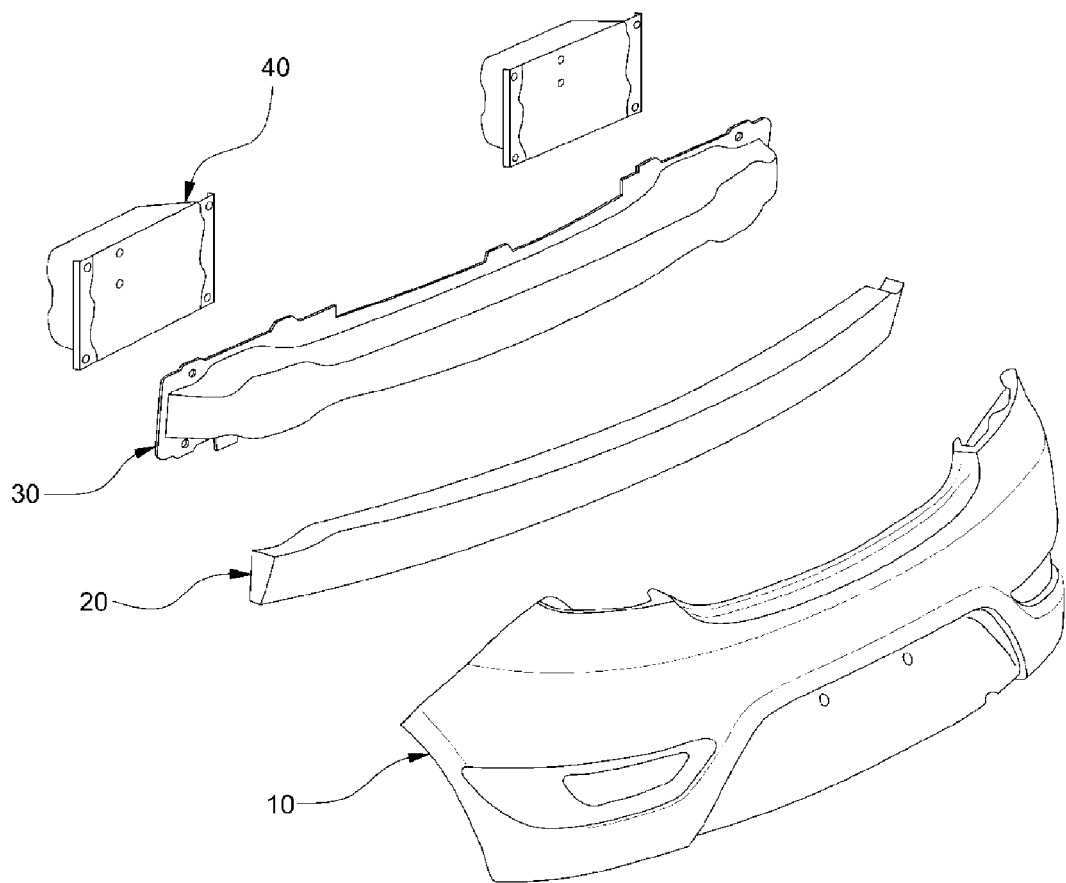
FIG. 1 is a perspective view showing the configuration of a typical bumper assembly for a vehicle.

Reference numerals set forth in the Drawings includes reference to the following elements as further discussed below:

10: bumper cover
20: energy absorber
30: bumper beam
40: stay
31: front portion
32 & 33: side portions
34: flange portion
35: insert reinforcing member
38: auxiliary reinforcing member (reinforcing sheet)

It should be understood that the appended drawings are not necessarily to scale, presenting a somewhat simplified representation of various illustrative features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The present invention provides a plastic composite bumper beam for a vehicle, characterized in that a loop-shaped insert reinforcing member is inserted into the bumper beam to provide improved mechanical properties, structural strength, crash performance, load introduction and load distribution to the fixation points.

In detail, the bumper beam of the present invention includes a bumper beam body having the shape of a bumper beam and formed of a fiber reinforced plastic composite material and an insert reinforcing member inserted into the bumper beam body. More specifically, the insert reinforcing member has a loop shape and is disposed in the longitudinal direction of the bumper beam body.

Here, the insert reinforcing member may be inserted in a single position or in a plurality of positions within the bumper beam body. Alternatively, a single insert reinforcing member or a plurality of insert reinforcing members may be inserted into the bumper beam body in each position.

Figure 2:
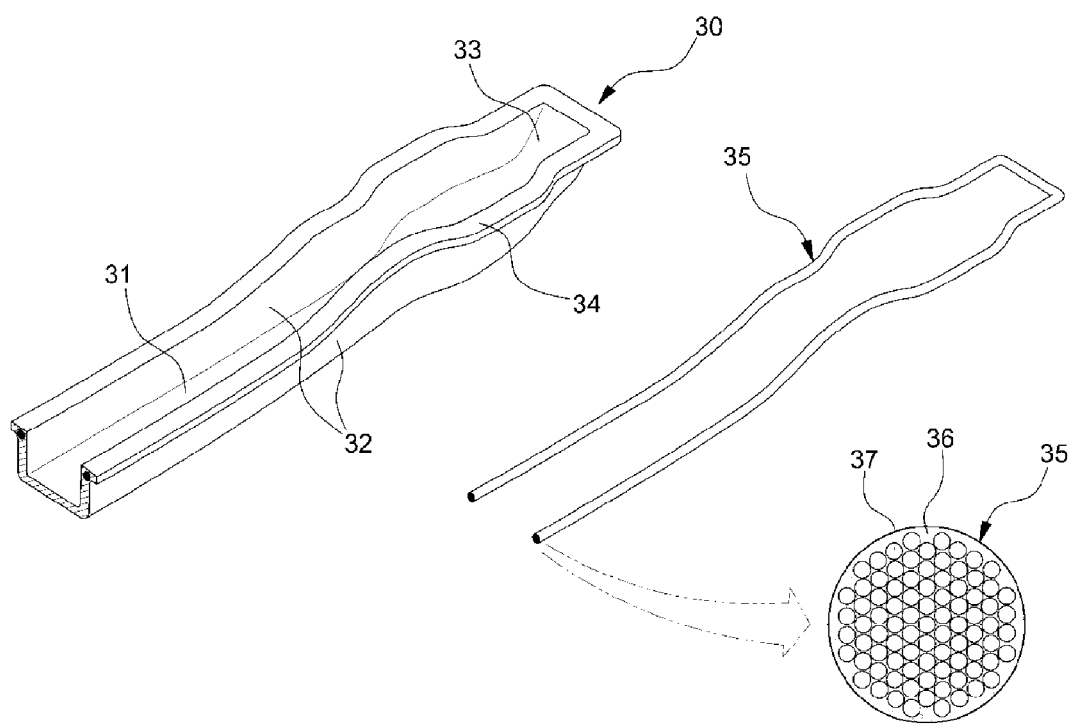
FIG. 2 is a perspective view showing the configuration of a bumper beam for a vehicle in accordance with an illustrative embodiment of the present invention.
Figure 3:
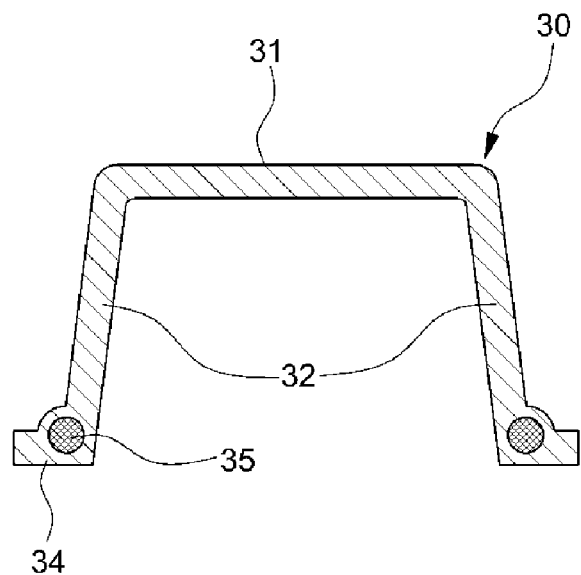
FIG. 3 is a cross-section view showing the configuration of a bumper beam for a vehicle in accordance with an illustrative embodiment of the present invention.
Figure 4:
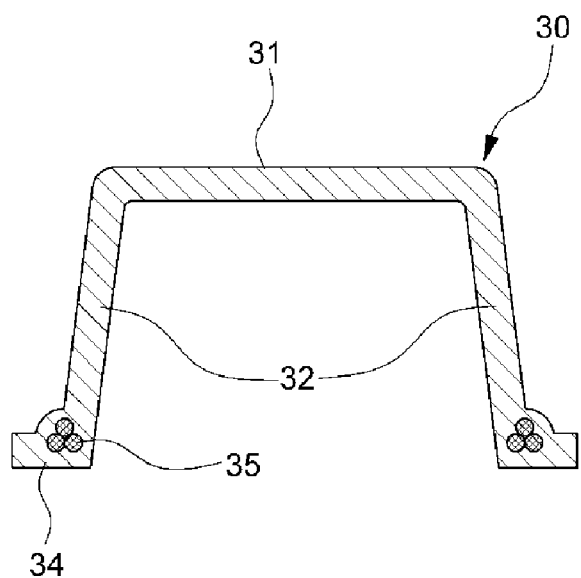
FIG. 4 is a cross-section view showing the configuration of a bumper beam for a vehicle in accordance with another illustrative embodiment of the present invention.

The bumper beam of the present invention will be described in more detail below. FIG. 2 is a perspective view showing the configuration of a bumper beam 30 for a vehicle in accordance with a illustrative embodiment of the present invention, in which an insert reinforcing member 35 is separated from the bumper beam 30, but in practice it is inserted and integrated into the bumper beam 30 (i.e., into the bumper beam body).

In FIG. 2, as the bumper beam 30 is bilaterally symmetrical, a half of the bumper beam 30 obtained by cutting the center is shown, and likewise a half of the insert reinforcing member 35 obtained by cutting the center is shown.

As shown in the figure, the bumper beam 30 of the present invention has a substantially "⊓" cross-sectional shape. The body, which forms the shape of the bumper beam 30 (hereinafter, referred to as the bumper beam body), has a structure in which side portions 32 and 33 are continuously formed along the entire circumference of a projecting front portion 31 and a flange portion 34 is continuously formed along the ends of the side portions 32 and 33.

In FIG. 2, the side portions at the top and bottom of the bumper beam body and the side portions at both ends thereof are denoted by reference numerals 32 and 33, respectively.

The insert reinforcing member 35 is separately formed of a high strength material and inserted into the bumper beam body during molding of the bumper beam body, and the entire insert reinforcing member 35 has a three-dimensional loop shape (e.g., a ring shape, and FIG. 2 shows a half section).

The insert reinforcing member 35 is used to improve the mechanical properties of the bumper beam 30 and ensure sufficient structural strength and crash performance, load introduction, load distribution to the fixation points. Thus, the entire insert reinforcing member 35 is embedded in the bumper beam body, not on the surface thereof, and is integrated therewith during molding of the bumper beam body.

Moreover, the insert reinforcing member 35 is continuously disposed along a loop-type path in the longitudinal direction on both sides of the bumper beam body and in the up and down direction on both ends thereof.

As such, during the molding of the bumper beam body, the separately formed insert reinforcing member 35 is inserted into a region of the bumper beam body, which needs to be reinforced, and thus the overall structural strength and crash performance of the bumper beam 30, and further, the structural strength and crash performance crash performance, load introduction, load distribution to the fixation points are improved through reduction of the bumper beam assembly.

In the present invention, the main material for the bumper beam body may be a fiber-reinforced plastic composite material such as a glass mat-reinforced plastic (GMRP) composite material, a long fiber-reinforced plastic (LFRP) composite material, and/or a short fiber-reinforced plastic (SFRP) composite material. Both thermoplastic and thermoset based plastics may be used.

The insert reinforcing member 35 having a three-dimensional loop shape as an intermediate material may be formed of a high strength material, compared to the material for the bumper beam body itself, or formed of a fiber-reinforced plastic composite material, the same material as the bumper beam body. Preferably, however, the insert reinforcing member 35 may be formed of a continuous fiber-reinforced plastic composite material.

Here, the main material for the bumper beam body and the intermediate material for the insert reinforcing member may be a composite material having a matrix of a thermoplastic resin such as polypropylene (PP), polyamide (PA), polybutylene terephthalate (PBT), polyethylene terephthalate (PET), thermoplastic elastomer (TPE), or thermoset resin such as unsaturated polyester (UP), Epoxy (EP) Polyurethane (PUR). Moreover, the main material for the bumper beam body and the intermediate material for the insert reinforcing member may include reinforcing fibers such as glass fibers, carbon fiber, natural fibers, aramid fibers, or ultrahigh molecular weight polyethylene fibers (UHMWPE), respectively.

The insert reinforcing member 35 may include the same matrix as the main material for the bumper beam body. In this case, it is possible to ensure sufficient interfacial adhesion even if an adhesive or welding process is not used. However, the insert reinforcing member 35 may be formed of a material having a higher strength, i.e., a material containing a higher content of reinforcing fibers, than the main material for the bumper beam body.

For example, when the GMRP, LFRP, or SFRP composite material is used, the main material for the bumper beam 30 may comprise the reinforcing fibers in an amount of about 5 to 50 vol % with respect to the total weight of the bumper beam body, and more preferably in an amount of about 10 to 30 vol %, and the material for the insert reinforcing member 35 may comprise the reinforcing fibers in an amount of about 15 to 90 vol %, and more preferably about 20 to 65 vol %.

The properties of the continuous fiber-reinforced composite material are more favorable than those of the short fiber-reinforced or long fiber-reinforced composite material and, therefore, if the main material for the bumper beam 30 includes short fibers or long fibers and the material for the insert reinforcing member 35 contains continuous fibers, it is not necessary that the fiber content of the insert reinforcing member 35 be as high.

The bumper beam body may be formed by various known methods such as injection molding, extrusion/compression molding, extrusion/injection molding, etc. as well as compression molding (i.e., press molding), injection/compression molding.

Referring to FIG. 2, a cross-sectional structure of the insert reinforcing member 35 reinforced with reinforcing fibers 37 in a matrix 36 of a thermoplastic resin is shown. The insert reinforcing member 35 may have an overall circular cross section as shown in the figure, but may have various cross sections, such as an overall elliptical cross section or an overall polygonal cross section including a square, rectangle, hexagon, etc. As such, the bumper beam 30 of the present invention is formed by inserting the insert reinforcing member 35 having a three-dimensional loop shape into a predetermined position of the bumper beam 30, not on the surface thereof. As a result, the bumper beam 30 is above to realize improved mechanical properties and crash performance.

Since the insert reinforcing member 35 including a high strength fiber-reinforced plastic composite material is formed into a three-dimensional loop shape, it is more advantageous in terms of the impact energy absorption of the bumper beam 30. Typically, the properties of the fiber-reinforced composite material vary according to the length and content of the fibers, and when a material containing a high content of continuous fibers is used for the insert reinforcing member 35, the reinforcing effect is further increased.

In the present invention, the insert reinforcing member 35 having a three-dimensional loop shape may be formed in various structures by varying its cross-sectional structure, thickness, shape, etc., and may be inserted in various positions of the bumper beam body by proper design of the mold for e.g. injection molding or compression molding.

FIGS. 3 to 7 are cross-section views showing the configuration of a bumper beam for a vehicle in accordance with various embodiments of the present invention. First, in an illustrative embodiment shown FIG. 3, a loop-shaped insert reinforcing member 35 is inserted into the boundary between a flange portion 34 and a side portion, to which a stay is connected. In this embodiment of the present invention only one insert reinforcing member 35 having a large diameter is used. In another embodiment shown in FIG. 4, however, a plurality of insert reinforcing members 35 having a relatively small diameter may be inserted in the same position as in FIG. 3. As such, according to the embodiments of the present invention, the insert reinforcing member 35 may be inserted into the bumper beam 30 where the stay is to be mounted.

Figure 5:
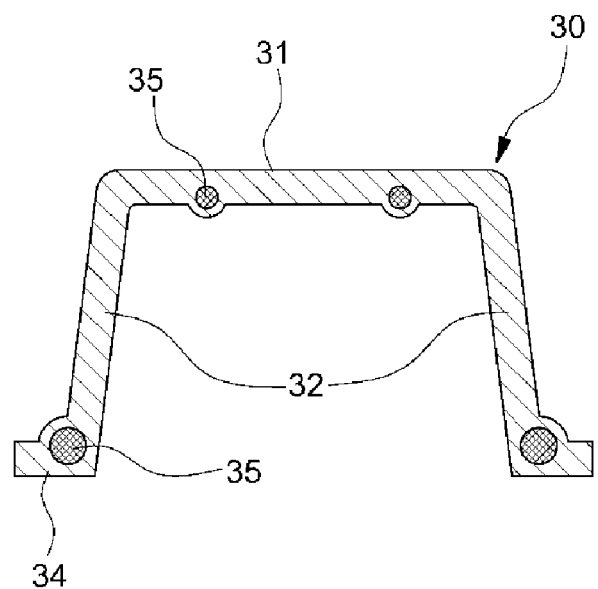
FIGS. 5 to 8 are cross-section views showing the configuration of a bumper beam for a vehicle in accordance with other various embodiments of the present invention, in which an insert reinforcing member and an auxiliary reinforcing member are used together.

In still another embodiment shown in FIG. 5, a plurality of insert reinforcing members 35 having the same or different diameters may be inserted in different positions. In this case, the insert reinforcing member 35 is inserted into the boundary between the flange portion 34 and the side portions 32 and further inserted into a front portion 31 projecting to the front. In detail, the insert reinforcing member 35 is inserted into the bumper beam 30, where the stay is to be mounted, and inserted into the front portion 31 projecting towards the front of the assembly. Here, the insert reinforcing member 35 inserted into the bumper beam 30, where the stay is to be mounted, may be eliminated.

Figure 6:
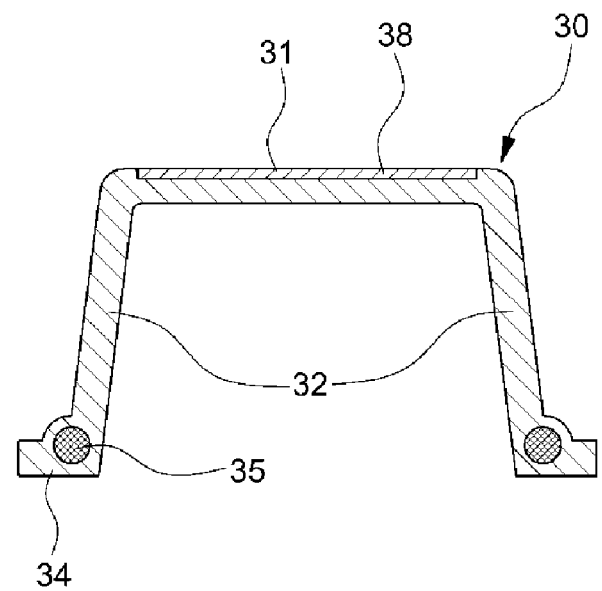
Figure 7:
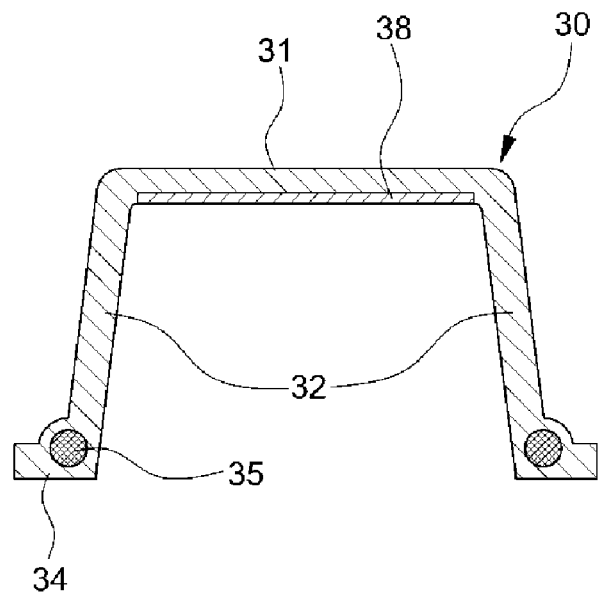

In other embodiments shown in FIGS. 6 and 7, a loop-shaped insert reinforcing member 35 and an auxiliary reinforcing member 38 may be used together. The auxiliary reinforcing member 38 may be a reinforcing sheet in the form of woven fiber-reinforced or continuous fiber-reinforced tape. The auxiliary reinforcing member 38 is attached to the outside of the front portion 31 projecting toward the front of the assembly (see FIG. 6) or to the inside of the front portion 31 (see FIG. 7).

The reinforcing sheet in the form of fiber-reinforced tape may be a reinforcing tape reinforced with unidirectional (UD) fibers in the longitudinal direction of the bumper beam. Further, the auxiliary reinforcing member 38 is disposed in the longitudinal direction on both sides of the bumper beam, and during the molding of the bumper beam body, may be fixed to the surface of the bumper beam body by insertion or by adhesion using an adhesive.

Figure 8:
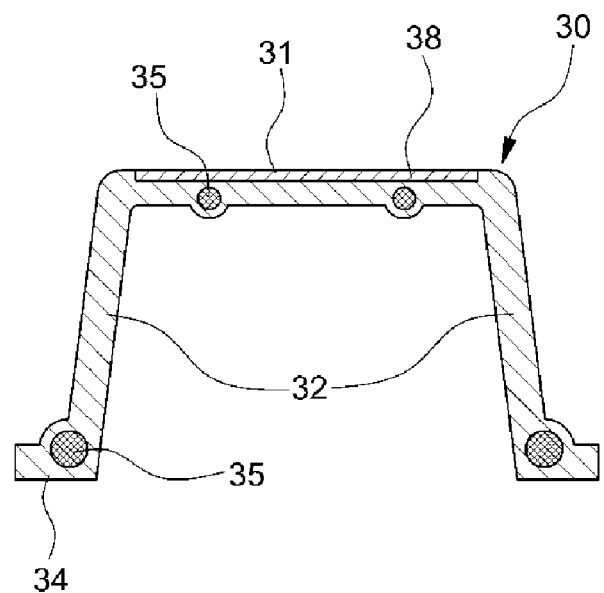

In a further embodiment shown in FIG. 8, the auxiliary reinforcing member 38 is further used in the embodiment of FIG. 5, and the insert reinforcing member 35 and the auxiliary reinforcing member 38 are the same as those described above. In addition to the loop-shaped insert reinforcing member 35, an additional insert reinforcing member having a discontinuous straight line or curve shape, not a continuous loop shape, may be inserted into the bumper beam body in the same manner The insert reinforcing member having a discontinuous straight line or curve shape may be formed of the same material as the loop-shaped insert reinforcing member and disposed in the longitudinal direction of the bumper beam body.

As described above, the plastic composite bumper beam for a vehicle according to the present invention is formed by inserting the insert reinforcing member having a three-dimensional loop shape into the bumper beam. Thus the bumper beam described in the illustrative embodiment of the present invention has improved mechanical properties and crash performance.

Additionally, the bumper beam of the present invention allows auto manufactures to produce a bumper beam with a decreased thickness, while at the same time having equivalent performance to the conventional thicker bumpers. Furthermore, the bumper beam of the present invention allows for reduction in the weight and manufacturing costs associated with making the vehicle. Moreover, the bumper beam of the present invention has improved mechanical properties, structural strength, crash performance, load introduction, load distribution to the fixation points and, thus it is possible to improve the degree of freedom in design and the marketability due to the reduction in thickness of the bumper.

The invention has been described in detail with reference to illustrative embodiments thereof. However, it will be appreciated by those skilled in the art that changes may be made in these embodiments without departing from the principles and spirit of the invention, the scope of which is defined in the appended claims and their equivalents.

What is claimed is:

1. A plastic composite bumper beam for a vehicle, comprising:
    a bumper beam body having a front portion and side portions which are continuously formed along an entire circumference of the front portion and formed of a fiber-reinforced plastic composite material; and
    an insert reinforcing member inserted into the bumper beam body along a continuous single loop-type path including two partial paths parallel to the side portions, the insert reinforcing member having a loop shape and disposed in the longitudinal direction of the bumper beam body.

2. The plastic composite bumper beam of claim 1, further including one or more additional insert reinforcing members inserted in a single position or in a plurality of positions of the bumper beam body.

3. The plastic composite bumper beam of claim 1, wherein the bumper beam body has flange portions which are continuously formed along the side portions of the bumper body, and the insert reinforcing member is inserted into a boundary between the side portions and the flange portions.

4. The plastic composite bumper beam of claim 1, wherein the bumper beam body comprises a fiber-reinforced plastic composite material selected from the group consisting of a glass mat-reinforced plastic (GMRP) composite material, a long fiber-reinforced plastic (LFRP) composite material, and a short fiber-reinforced plastic (SFRP) composite material.

5. The plastic composite bumper beam of claim 4, wherein the insert reinforcing member comprises a fiber-reinforced plastic composite material having a strength relatively higher than the bumper beam body.

6. The plastic composite bumper beam of claim 5, wherein the fiber-reinforced plastic composite material of the insert reinforcing member is a continuous fiber-reinforced plastic composite material.

7. The plastic composite bumper beam of claim 5, wherein the fiber-reinforced plastic composite material for the bumper beam body and the fiber-reinforced plastic composite material for the insert reinforcing member comprise reinforcing fibers selected from the group consisting of glass fibers, carbon fiber, natural fibers, aramid fibers, and ultrahigh molecular weight polyethylene fibers.

8. The plastic composite bumper beam of claim 5, wherein the fiber-reinforced plastic composite material for the bumper beam body and the fiber-reinforced plastic composite material for the insert reinforcing member comprise a same or a different matrix, wherein the insert reinforcing member is integrated with the bumper beam body during molding.

9. The plastic composite bumper beam of claim 8, wherein the matrix of the fiber-reinforced plastic composite material is a material selected from a group consisting of polypropylene (PP), polyamide (PA), polybutylene terephthalate (PBT), and polyethylene terephthalate (PET), thermoplastic elastomer (TPE), and thermoset resin such as unsaturated polyester (UP), Epoxy (EP) Polyurethane (PUR)).

10. The plastic composite bumper beam of claim 1, wherein the surface of the bumper beam body is reinforced with a woven, braided or knitted fiber-reinforced sheet or a continuous fiber-reinforced sheet fixed thereto.

11. The plastic composite bumper beam of claim 1, wherein the insert reinforcing member has an overall circular, elliptical, or polygonal cross section.

\* \* \* \* \*